Figure 1:
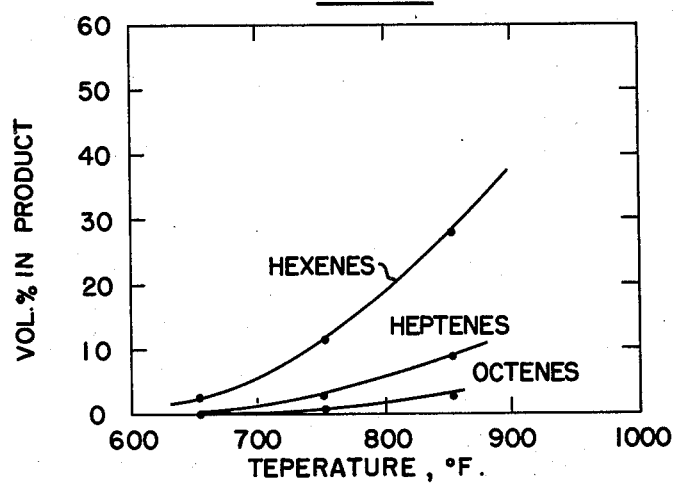

Robert B. Long    Inventor

By *Seymour Stahl*    Attorney 3,154,593
PROCESS FOR METHYLATING OLEFINS
Robert B. Long, Wanamassa, N.J., assignor to Esso Research and Engineering Company, a corporation of Delaware
Filed July 1, 1960, Ser. No. 40,477
11 Claims. (Cl. 260—683)

This invention relates to a process for the methylation of olefinic materials to produce higher molecular weight olefinic materials. More specifically this invention relates to the selective methylation of $C_2$–$C_{30}$ olefins to produce higher olefins containing predominantly either one or two more carbon atoms than the feed material. Generally these higher olefins will be more highly branched than the starting material. Most specifically, this invention relates to reacting an olefinic material with carbon monoxide and hydrogen at elevated temperatures in the presence of catalysts comprising oxides of aluminum, zirconium or thorium or mixtures of these materials. This application is a continuation-in-part of Serial No. 795,247, filed February 24, 1959, now abandoned.

Numerous prior art processes are known for effecting alkylation of various hydrocarbons such as aromatic, paraffinic and olefinic hydrocarbons. However, in general these prior art processes have required the use of relatively expensive alkylation reactants. For example it has been suggested to employ an alkyl halide such as methyl chloride in the presence of a "catalyst" to effect an addition of the methyl group on to the hydrocarbon. The "catalyst" employed in this reaction is calcium oxide or the like wherein the halogen of the alkyl halide reacts with the catalyst to form calcium chloride, resulting in an attachment of the alkyl group to the olefinic compound. This technique is satisfactory for the preparation of certain alkylates, however, the "catalyst" is costly and is consumed in the process. In general, therefore, the process is not considered commercially attractive.

Alternatively, in the prior art it has been known that aldehydes and alcohols may be prepared by reacting olefins with carbon monoxide and hydrogen by the "oxo process." These aldehydes conventionally are hydrogenated to form alcohols and of course conceivably a dehydration of the alcohols produced could be utilized to obtain olefins. However, this process would be uneconomical as compared to the present one-stage process for obtaining olefins directly.

It has now been discovered that the methylation of olefinic materials to produce more highly branched olefins can be effected with high yields and good selectivity to desired products by resort to the present process which comprises in general the reaction of an olefinic material with carbon monoxide and hydrogen in the presence of certain catalysts at elevated temperatures. During the process some isomerization of the carbon atoms and/or double bond may be effected, if desired, depending on the temperatures employed.

The olefinic starting materials which may be used in the present invention may be described by the following formulas for alicyclic and cyclic compounds respectively.

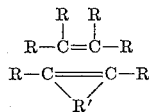

wherein each R is a hydrogen atom or alkyl group and R' is a branched or straight chain alkylene group. In the above formulas the total number of carbon atoms is in the range of 2–30, preferably 2–15. Additionally, of the cyclic olefins those having 4–6 carbon atoms in the ring are preferred.

The olefins utilized as feed stocks may be single or mixed olefins obtained from any source such as from catalytic or steam cracking, or other processes for the derivation of olefins. As an example, a crude $C_5$ fraction from catalytic or steam cracking may be methylated to obtain a product having a higher octane rating. Thus, one may start with a $C_4$ olefinic hydrocarbon and obtain as a product a mixture of $C_5$, $C_6$ and $C_7$ olefinic hydrocarbons of different isomeric structures. The olefins employable in this process include propylene, butene-1, butene-2, isobutene, and the various pentenes, hexenes, heptenes, octenes, nonenes, decenes, dodecenes, tridecenes, etc. up to the $C_{15}$ olefins. Cyclic olefins such as alkyl cyclopentenes, cyclohexenes, cycloheptenes and the like are also useful as feed materials for this reaction. In this process the olefinic feed compound may be converted selectively as desired to an olefin having one, two or more carbon atoms per molecule than the starting feed.

Other olefins which may be desirably treated according to the present invention are high boiling petroleum oils containing olefinic waxes which must be dewaxed to make them suitable for use in lubricants. Suitable oils are materials boiling in the range of 660 to 1020° F., preferably 700 to 930° F., e.g. 750 to 840° F. These oils contain in general 5 to 20 wt. percent wax and may be obtained by cracking of waxy feed streams, polymerization of ethylene or butadiene, or by Fischer-Tropsch synthesis.

Thus, the straight chain olefins are alkylated to form branched olefins which, of course, have lower pour points and are also structurally more desirable in lubricating oils than the normal olefins. A final hydrogenation can be used to prepare the finished lube base stock. In this way the yield of lubricating oil is increased and the capacity of the dewaxing plant is increased since only n-paraffins rather than n-paraffins and n-olefins need be removed by filtration. Furthermore, filtration can be eliminated entirely if all of the waxy molecules are olefinic.

The present process may be employed to prepare olefins useful for other purposes such as in the manufacture of specific alcohols via sulfuric acid hydration or via the oxo route. When a highly branched hydrocarbon is preferred, it is desirable to employ as feed stock a relatively highly branched olefin rather than the straight chain compounds.

Examples of other preferred feed stocks include diolefins such as butadiene, isoprene, piperylene, cyclopentadiene and methylcyclopentadiene. The products will be mono- or dialkylated, depending on the severity of the reaction and the residence time employed. When employing $C_4$–$C_8$ diolefins as feed stock it is preferred to utilize mild conditions to minimize polymerization.

As the synthesis gas, any gas containing carbon monoxide and hydrogen may be employed. Synthesis gas is defined herein broadly as any gas comprising carbon monoxide and hydrogen. The ratio of carbon monoxide to hydrogen usable is from 0.2–8:1; however, preferred ratios are in the order of 0.5–4:1. Molar ratios of synthesis gas to olefin are 0.5–10:1, preferably 2–4:1, specifically 3:1. Larger excesses of synthesis gas may be employed; however, it has been found that while polymethylation may be obtained by increasing the ratio of synthesis gas to olefin, the selectivity to specific isomers, of course, decreases.

The synthesis gas and the olefinic feed are reacted, preferably, in the vapor phase, at elevated temperatures in the range of 450 to 1000° F., preferably 650 to 900° F., specifically 750° F., with pressures of from atmospheric to 3000 p.s.i.g., preferably 250 to 1000 p.s.i.g., specifically 750 p.s.i.g. The degree of methylation is readily controlled by controlling the reaction time, and of course, the ratio of synthesis gas to olefin. The reaction temperature has a marked effect on the selectivity toward the various isomers in the product mixture. For example, from 2-methylbutene-2, one obtains a high selectivity to 2,3-dimethylbutene-2 at temperatures within the lower region of this range, i.e. 450–750° F.; whereas with the same feed stock temperatures in the range of 750–900° F. promote a highly selective production of methyl pentenes. This control of selectivity is important since it will determine the ultimate branchiness and isomeric structure of the final product. The product, after cooling and condensing into a liquid phase, may be separated by fractionation or other conventional techniques employed for the separation of isomeric mixtures. The work-up of the product in the present process is simplified somewhat by the absence of any water phase and also in that the liquid product contains little or no oxygenated compounds.

The catalysts which are suitable for use in the present process are in general oxides of zirconium, aluminum and thorium and mixtures of these compounds with oxides of zinc, silicon and magnesium. Where a one-component catalyst is utilized, best results are obtained with alcoholate alumina, zirconium or thorium oxides. Preferably the catalyst will comprise at least two of the above described metal oxides. Examples of such mixtures include $ZnO-Al_2O_3$, $ZnO-Al_2O_3-SiO_2$, $ZnO-Al_2O_3-ThO_2$, $ZnO-ThO_2$, $Al_2O_3-ThO_2$, and $Al_2O_3-SiO_2$. An additional catalytic material which may be used is cesium oxide. This material used alone or in combination with the above described metal oxides is of little interest, however, due to its low activity.

In a two or three component system the ratio of one metal oxide to the other metal oxide or metal oxides may vary considerably, e.g. the first metal oxide may be 5 to 95 wt. percent, e.g. 80 wt. percent, of the total catalyst. Further, in a three-component catalyst the amount of the second metal oxide may be 5 to 95 wt. percent, e.g. 80 wt. percent, of the third metal oxide. Additional components such as catalyst promoters may be present in amounts of 0.1 to 5 wt. percent, preferably 0.5 to 2 wt. percent, e.g. 1 wt. percent. Catalyst promoters which may be used are those in general employed to control the distribution of products and influence side reactions of either the olefin or synthesis gas. Preferred catalyst promoters are alkali metal oxides or carbonates such as $K_2O$, $K_2CO_3$, $Na_2CO_3$, etc.

In a preferred embodiment a single component selected from zirconium and thorium oxides may be supported on alumina, silica, kieselguhr, synthetic and natural zeolites or other conventional supports. Additionally, aluminum oxide may be supported on silica, kieselguhr, synthetic and natural zeolites or other conventional supports differing from the supported material. The catalyst mixture may be produced by coprecipitating the components in accordance with known manufacturing techniques or mixed physically and formed into pills. When employing a supported catalyst as above described the single zirconium, aluminum or thorium oxide should preferably comprise at least 25 wt. percent of the total catalyst.

To demonstrate the preference for mixed metal oxide catalysts it was determined experimentally that zinc oxide which is a well known catalyst for manufacture of alcohols from $CO-H_2$ mixtures, is relatively inactive when used alone and that most aluminas, except for alcoholate alumina, are only moderately active even at extremely high temperatures, e.g. 950° to 1000° F. It was further discovered that conventional acidic cracking catalysts such as mixtures of silica and alumina in proportions of 4–8:1 of the former to the latter are also not preferred due to excessive polymer formation. However, small amounts of silica, below the range described above, may be used to increase the stability of the catalyst as is conventional in the art.

It should be noted that although acid catalysts such as the cracking catalysts above described are unsuitable since they promote excessive polymerization that these catalysts may be used by modifying them to include 0.2 to 2.0 wt. percent, e.g. 1 wt. percent of materials such as potassium oxide or carbonate to neutralize the acid content of these catalysts. These neutralized catalysts are known in the art and may be prepared for example by impregnating the cracking catalyst with a water solution of an alkali metal carbonate, e.g. potassium carbonate, drying and calcining at high temperatures, e.g. at 1200° F. for four hours.

To further illustrate the present invention, reference is now had to the following illustrative examples:

EXAMPLE 1

2-methylbutene-2 was reacted with synthesis gas at a molar ratio of synthesis gas to olefin of 3:1 at a temperature of 850° F. and a pressure of 500 p.s.i.g. in the presence of a solid catalyst comprising 40 wt. percent zinc oxide and 60 wt. percent alumina for a residence time of 270 seconds. The synthesis gas had a $CO/H_2$ mole ratio of 1. A conversion of 2-methylbutene-2 of approximately 50 wt. percent was obtained. The resultant liquid hydrocarbon product was a mixture of branched hexenes, heptenes, octenes and unreacted feed. The hexenes amounted to 31 volume percent of the hydrocarbon product, the heptenes accounted for 11 volume percent, and the octenes accounted for 3 volume percent. There was no water layer present. The $C_6$ olefinic product was a mixture of methylpentenes and dimethylbutenes.

EXAMPLES 2 AND 3

2-methylbutene-2 was reacted with synthesis gas in the ratio of 1 mole of synthesis gas per mole of olefin at 500 p.s.i.g. for a residence time of 270 seconds at 850° F. In Example 2 an $H_2/CO$ ratio of 1.9 was employed, whereas in Example 3 this ratio was maintained at 1. In both examples and in Examples 4–9 following, the reaction was carried out in vapor phase over a catalyst comprising 40% by weight zinc oxide and 60% alumina.

The following table illustrates the effect of varying the hydrogen to carbon monoxide ratio and points up the advantages that are obtained by employing relatively low hydrogen to carbon monoxide ratios in the synthesis gas.

*Table 1*

|  | Example 2 | Example 3 |
|---|---|---|
| $H_2/CO$ in Gas (mole ratio) | 1.9 | 1.0 |
| Liquid Product, Vol. Percent: |  |  |
| Hexenes | 7.9 | 7.3 |
| Heptenes | 1.6 | 2.8 |
| Isopentane | 3.5 | 3.0 |
| Selectivity, Percent of $C_6^=$: |  |  |
| 2,3-DMB*-2 | 18 | 16 |
| 2,3-DMB-1 | 17 | 16 |

* DMB represents dimethylbutene.

It is noted from the comparison of Examples 2 and 3 that the total amount of methylated product is greater at the lower hydrogen to carbon monoxide ratios and the conversion to heptenes is increased. If it is desired to produce the 2,3-dimethylbutenes without doubly methylating the feed, higher hydrogen to carbon monoxide ratios may be employed. However, higher $H_2/CO$ ratios give more of the undesirable hydrogenation of the feed to form isopentane.

EXAMPLES 4 AND 5

2-methylbutene-2 was reacted with synthesis gas in the ratio of one mole of synthesis gas per mole of olefin at different pressures for a residence time of 270 seconds at 850° F. with a hydrogen to carbon monoxide ratio of 1:1. A comparison of Examples 4 and 5 shows that appreciably more hexenes are formed at the lower pressure.

Table 2

|  | Example 4 | Example 5 |
| --- | --- | --- |
| Pressure, p.s.i.g. | 500 | 250 |
| Contact Time, Seconds | 270 | 270 |
| Liquid Product, Vol. Percent: |  |  |
| Hexenes | 7.3 | 9.8 |
| Heptenes | 2.8 | 2.8 |
| Isopentane | 3.0 | 6.3 |
| Selectivity, Percent of $C_6^=$: |  |  |
| 2,3-DMB-2 | 16 | 17 |
| 2,3-DMB-1 | 16 | 14 |

However, the selectivity to methylation vs. hydrogenation is decreased appreciably by low pressure operation.

EXAMPLES 6 AND 7

Examples 6 and 7 show the effect of varying synthesis gas to olefin ratios. 2-methylbutene-2 was reacted at 500 p.s.i.g. pressure and at 850° F. In Example 6 the mole ratio of synthesis gas to olefin was maintained at 3:1 and Example 7 at 1:1.

Table 3

|  | Example 6 | Example 7 |
| --- | --- | --- |
| $CO/H_2$ Mole Ratio | 1 | 1 |
| Gas/HC Mole Ratio | 3 | 1 |
| Contact Time, Seconds | 270 | 270 |
| Liquid Product, Vol. Percent: |  |  |
| Hexenes | 28 | 7.3 |
| Heptenes | 8.7 | 2.8 |
| Isopentane | 9.5 | 3.0 |
| Octenes | 5.4 | 0 |
| Selectivity, Percent of $C_6^=$: |  |  |
| 2,3-DMB-2 | 15 | 16 |
| 2,3-DMB-1 | 13 | 16 |

It will be noted that with the higher mole ratio of synthesis gas to olefin the conversion to methylated olefins was over three times that obtained when employing a synthesis gas to olefin ratio of 1:1. Furthermore there is an advantage in methylation vs. hydrogenation selectivity in using high gas to olefin ratios.

EXAMPLES 8 AND 9

In the following examples the procedure employed in Example 3 was repeated varying only the contact time with the following results.

Table 4

|  | Example 8 | Example 9 |
| --- | --- | --- |
| Contact Time, Seconds | 270 | 540 |
| Liquid Product, Vol. Percent: |  |  |
| Hexenes | 7.3 | 12.5 |
| Heptenes | 2.8 | 3.2 |
| Isopentane | 3.0 | 7.2 |
| Selectivity, Percent of $C_6^=$: |  |  |
| 2,3-DMB-2 | 16 | 15 |
| 2,3-DMB-1 | 16 | 16 |

From the above table, it is apparent that the conversion was increased by employing twice the contact time, viz. 540 seconds compared to 270 seconds. With the longer contact time a substantially higher conversion to $C_6$ and $C_7$ product was obtained while the selectivity to the various dimethylbutenes remained about the same. Long contact times tend to increase hydrogenation selectivity.

EXAMPLE 10

Figure 2:
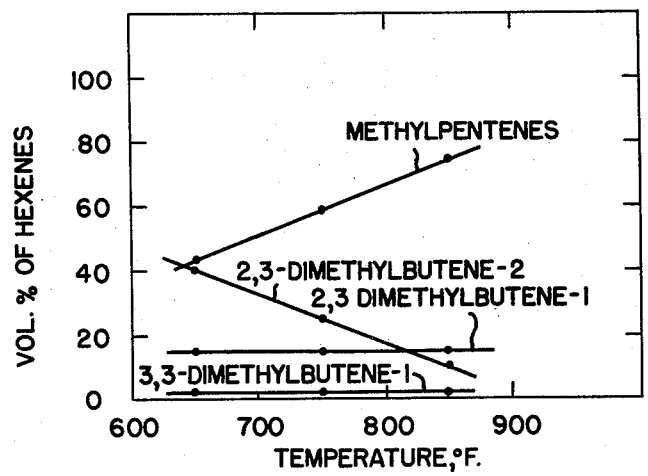

To demonstrate the effect of reaction temperature upon conversion and selectivity, a number of additional runs were made as follows. One mole of 2-methylbutene-2 and three moles of an equimolar mixture of carbon monoxide and hydrogen were reacted in a reactor at 500 p.s.i.g. for a residence time of 270 seconds. The synthesis gas and olefin were passed downwardly through a reaction vessel packed with the specified catalyst and maintained at the temperatures noted. The results of these runs are shown in FIGURES 1 and 2. In FIGURE 1 it may be seen that conversion to hexenes is low at 650° F., but increases rapidly with temperature. The conversion to $C_7$ and $C_8$ olefins similarly increased with increase in temperatures.

To demonstrate the selectivity to the various isomers obtained at different temperatures, reference may be had to FIGURE 2 of the drawings which shows in graph form the effect of reaction temperatures on selectivity. From FIGURE 2 it will be noted that at lower reaction temperatures, e.g., at 650° F. there is a high degree of selectivity to 2,3-dimethylbutene-2. Conversely, at higher reaction temperatures the selectivity was found to be toward the methylpentenes with a decrease in selectivity toward 2,3-dimethylbutene-2. Considering these two figures together, an optimum temperature apparently exists in the vicinity of 700–800° F. for making the dimethylbutene products.

The above examples show only the methylation and polymethylation of methylbutene in order to demonstrate the versatility of this process with regard to conversion and selectivity. Both the lower and higher olefins are methylated in the same manner under the same general conditions. With regard to the higher olefins, i.e. $C_7$–$C_{15}$, slightly lower reaction temperatures are preferred to promote the reaction of these more reactive compounds. For example, a heptene fraction obtained from a U.O.P. polymerization reaction is reacted under the same conditions as shown in Example 4, but at 800° F. to obtain an isooctene mixture more highly branched than the $C_7$ feed.

EXAMPLE 11

A number of catalysts were tested and compared for use in the present process utilizing 2-methyl-2-butene under the following reaction conditions:

$CO/H_2$ mole ratio ----------------------------- 1.0
Synthesis gas/olefin mole ratio ----------------- 1.0
Pressure, p.s.i.g. ------------------------------- 250
Carbon monoxide-hydrogen gas rate, v./v./hr.
  (STP) ---------------------------------------- 92.1
Liquid olefin feed rate, v./v./hr. --------------- 0.4

Temperatures were in the range of 600 to 850° F. except as otherwise indicated. The compositions of the catalyst in weight percent are given where available.

The following catalysts were found to produce essentially no methylation, i.e. less than 1 wt. percent of higher olefins were obtained based on olefin feed.

Iron ($H_2$ reduced iron oxide)
80% CuO, 20% ZnO (coprecipitated from nitrates)
50% CuO, 50% ZnO (coprecipitated from nitrates)
20% CuO, 80% ZnO (coprecipitated from nitrates)
90.5% $Fe_2O_3$, 7% $K_2CO_3$, 2.5% $Cr_2O_3$ (also tested utilizing a $CO/H_2$ gas rate of 276.5)
17.5% $Fe_2O_3$, 5% CuO, 5% $K_2O$, 72.5% MgO
$H_2$ reduced $Fe_2O_3$ (liquid olefin rate was 1.56, also tested at 500 p.s.i.g.)
Copper chromia (mixed oxides)
80% ZnO, 20% $Cr_2O_3$ (utilized 500 p.s.i.g. pressure and $CO/H_2$ gas rate of 53.8 v./v./hr.)
50% ZnO, 50% $Cr_2O_3$ (utilized 500 p.s.i.g. pressure and $CO/H_2$ gas rate of 53.8 v./v./hr.)
Activated carbon (utilized 500 p.s.i.g. pressure and $CO/H_2$ gas rate of 53.8 v./v./hr.)

A 31.5% CoO–6% $ThO_2$–1.2% MgO–61.3% kieselguhr (Fischer-Tropsch) catalyst was found to be unsatisfactory, although some methylation was obtained, due to the hydrogenation of large amounts of olefins boiling in the feed range, i.e. the ratio of paraffins formed to higher olefins formed was above 1.5:1 and reached as high as 2.2:1. All of the copper catalysts and most of the iron catalysts also gave excessive hydrogenation suggesting that Group VIII and IB elements should be excluded from the catalyst. The following catalysts were found to be preferred in that high conversions to higher olefins were obtained along with low ratios, i.e. less than 0.5:1 of paraffins formed to higher olefins formed were obtained.

Alcoholate alumina
40% ZnO–60% $Al_2O_3$ (mixed powders were pilled)
40% ZnO–60% $Al_2O_3$ (coprecipitated)
80% $ThO_2$–20% $Al_2O_3$
39.5% ZnO–59.5% $Al_2O_3$–1% $K_2CO_3$
99% $Al_2O_3$–1% $K_2CO_3$ With the above catalysts the addition $K_2CO_3$ decreased catalyst activity but improved selectivity to specific olefin products.

EXAMPLE 12

A $C_5$ olefin stream obtained from catalytic cracking of gas oil was utilized over alumina catalyst along with pressures of 750 p.s.i.g., equimolar $CO/H_2$ mixture gas rate of 370 v./v./hr., and liquid olefin feed rates of 0.2 v./v./hr. Over 20% of the product was $C_6^+$ olefins indicating that mixtures as well as pure compounds can be used as feed stocks. Similar results were obtained with a 40% ZnO–60% $Al_2O_3$ catalyst. Pure 3-methyl-1-butene over 40% ZnO–60% $Al_2O_3$ and pure cis-pentene-2 over alcoholate alumina also gave extensive methylation.

It is to be understood that this invention is not limited to the specific examples, which have been offered merely as illustrations, and that modifications may be made without departing from the spirit of this invention.

What is claimed is:

1. A process for synthesizing an olefinic material having at least $n+1$ carbon atoms from an olefinic material having $n$ carbon atoms, wherein $n$ is at least 3, which comprises reacting a feedstock consisting of the said olefinic material having $n$ carbon atoms with carbon monoxide and hydrogen at temperatures of 450 to 1000° F. in the presence of a catalyst comprising a material selected from the group consisting of oxides of aluminum, zirconium and thorium and mixtures of these oxides with oxides of zinc, silicon and magnesium.

2. A process according to claim 1 wherein the catalyst is an alumina prepared from aluminum alcoholate.

3. A process according to claim 1 in which the olefinic material is a $C_4$–$C_{15}$ diolefin.

4. A process for synthesizing an olefin having at least $n+1$ carbon atoms from an olefin having $n$ carbon atoms, $n$ being an integer from 3 to 15, which comprises reacting a feedstock consisting of said olefin having $n$ carbon atoms with a synthesis gas comprising carbon monoxide and hydrogen at temperatures of from 450 to 1000° F. and at pressures of from atmospheric to 3000 p.s.i.g. in the presence of a catalyst comprising a material selected from the group consisting of oxides of aluminum, zirconium and thorium and mixtures of these oxides with oxides of zinc, silicon and magnesium.

5. A process according to claim 4 wherein the mole ratio of synthesis gas to olefin is from 0.5–10:1 and wherein the mole ratio of carbon monoxide to hydrogen is from 0.2–8:1.

6. A process according to claim 4 wherein the mole ratio of synthesis gas to olefin is from 2–4:1 and the mole ratio of carbon monoxide to hydrogen is 0.5–4:1.

7. A process for synthesizing an olefin having at least $n+1$ carbon atoms from an olefin having $n$ carbon atoms, $n$ being an integer from 3–15, which comprises reacting a feedstock consisting of said olefin having $n$ carbon atoms with a synthesis gas comprising carbon monoxide and hydrogen at temperatures of from 450 to 1000° F. and at pressures of from 250 to 1000 p.s.i.g. in the presence of a catalyst which comprises zinc oxide and alumina.

8. A process according to claim 7 wherein the mole ratio of synthetic gas to olefin is from 0.5–10:1 and wherein the mole ratio of carbon monoxide to hydrogen is from 0.2–8:1.

9. A process according to claim 7 wherein the mole ratio of synthesis gas to olefin is from 2–4:1 and the mole ratio of carbon monoxide to hydrogen is 0.5–4:1.

10. A process for synthesizing 2,3-dimethylbutene from 2-methylbutene-2 which comprises reacting a feedstock consisting of 2-methylbutene-2 with a synthesis gas comprising carbon monoxide and hydrogen at temperatures of from 650–950° F. and at pressures of from 500 to 750 p.s.i.g. in the presence of a catalyst comprising a material selected from the group consisting of oxides of aluminum, zirconium and thorium and mixtures of these oxides with oxides of zinc, silicon and magnesium.

11. A process according to claim 10 wherein the catalyst comprises zinc oxide and alumina.

References Cited in the file of this patent

UNITED STATES PATENTS

| | | |
|---|---|---|
| 2,600,452 | Voorhies | July 17, 1952 |
| 2,623,074 | Ratcliff | Dec. 23, 1952 |
| 2,821,559 | Habeshaw et al. | Jan. 28, 1958 |
| 2,917,532 | Watkins | Dec. 15, 1959 |
| 2,973,384 | Hayashi et al. | Feb. 28, 1961 |

FOREIGN PATENTS

| | | |
|---|---|---|
| 526,142 | Italy | May 14, 1955 |